(12) United States Patent
Horikomi et al.

(10) Patent No.: US 6,687,768 B2
(45) Date of Patent: Feb. 3, 2004

(54) DATA STREAM GENERATION APPARATUS AND METHOD OF SAME, VARIABLE LENGTH CODED DATA STREAM GENERATION APPARATUS AND METHOD OF SAME, AND CAMERA SYSTEM

(75) Inventors: Hitomi Horikomi, Kanagawa (JP); Yoshifumi Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 295 days.

(21) Appl. No.: 09/898,671

(22) Filed: Jul. 3, 2001

(65) Prior Publication Data

US 2002/0004862 A1 Jan. 10, 2002

(30) Foreign Application Priority Data

Jul. 5, 2000 (JP) ..................... P2000-203983

(51) Int. Cl.[7] .................................. G06F 3/00
(52) U.S. Cl. ..................... 710/30; 710/65; 375/240
(58) Field of Search ...................... 710/30, 65; 375/240

(56) References Cited

U.S. PATENT DOCUMENTS 5,020,055 A * 5/1991 May, Jr. ..................... 370/474
5,168,356 A * 12/1992 Acampora et al. ...... 375/240.15
5,606,370 A * 2/1997 Moon ..................... 375/240.23
5,961,626 A * 10/1999 Harrison et al. ............ 710/305
6,078,690 A * 6/2000 Yamada et al. ............. 382/233
6,098,129 A * 8/2000 Fukuzawa et al. ............ 710/65
6,501,859 B1 * 12/2002 Kajiwara ..................... 382/239

* cited by examiner

Primary Examiner—Jeffrey Gaffin
Assistant Examiner—Justin Knapp
(74) Attorney, Agent, or Firm—Frommer Lawrence & Haug LLP; William S. Frommer

(57) ABSTRACT

A data stream generation apparatus for generating a string of fixed length data from variable length data with a smaller circuit and simpler configuration and control. It comprises a control data inserting means for inserting control data with a predetermined data pattern into the variable length data, a first data combining means for successively combining the variable length data and the inserted control data, a fixed length data extracting means for extracting predetermined fixed length data from the combined data, a data pattern detecting means for detecting a data pattern other than the control data, and an output data selecting means for successively selecting an output data from the fixed length data, and, when the first data pattern other than the control data is detected, selecting second data having a predetermined second data pattern immediately after the first data pattern as the output data.

21 Claims, 14 Drawing Sheets

FIG. 15

| SELECT SIGNAL | SELECT BITS |
|---|---|
| 3'b000(0) | INPUT DATA[31:24] |
| 3'b001(1) | INPUT DATA[23:16] |
| 3'b010(2) | INPUT DATA[15:8] |
| 3'b011(3) | INPUT DATA[7:0] |
| 3'b1xx(4~7) | 00h |

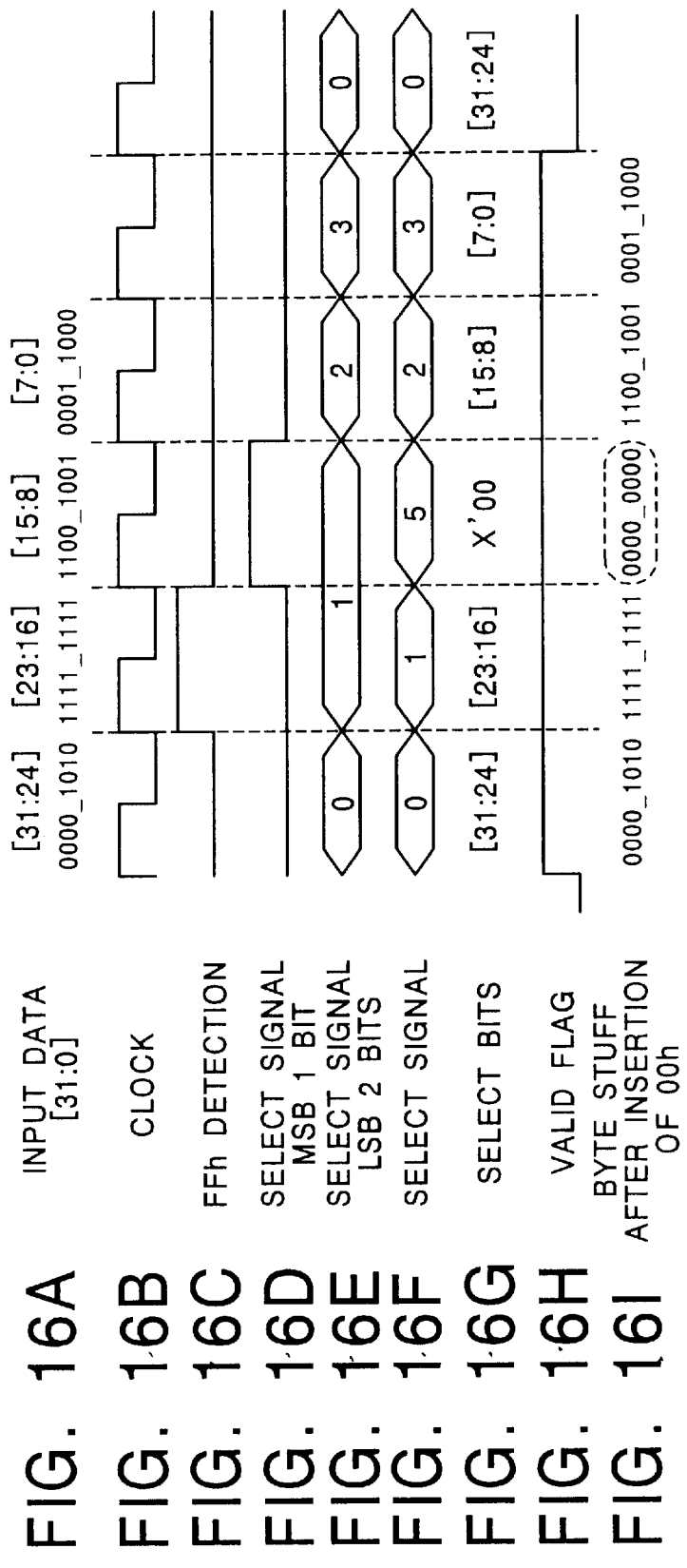

DATA STREAM GENERATION APPARATUS AND METHOD OF SAME, VARIABLE LENGTH CODED DATA STREAM GENERATION APPARATUS AND METHOD OF SAME, AND CAMERA SYSTEM

BACKGROUND OF THE INVENTION

1. Field of the Invention

The present invention relates to a data stream generation apparatus and a method of same, a variable length coded data stream generation apparatus and a method of same, and a camera system.

2. Description of the Related Art

There are various systems for encoding image data, audio data, and so on. The JPEG (Joint Photographic Experts Group) system is a typical such system widely used when encoding still images.

In this JPEG system, various control codes called "markers" are used to define the structure of the compressed and coded bit stream.

For example, in the DCT system adopted in the JPEG system, although the DC component of a DCT coefficient is expressed by a differential value with one previous block using the correlation between blocks in order to reduce the amount of information, if an error occurs in the data for some reason when transmitting the JPEG compressed and coded data, a large influence is given to the following blocks.

To prevent this, a marker called a "restart marker" (RSTm) for clearing the held DC component value is inserted in the bit stream of the JPEG image data for every unit called a "minimum coded unit" (MCU) comprised of a set of 8×8 pixel blocks.

Further, there are a start-of-image (SOI) marker indicating the start of an image, an end-of-image (EOI) marker indicating the end of an image, etc.

Each of these markers include a 1-byte header expressed by FFh ("h" indicates a hexadecimal notation).

For example, the codes FFD0H to FFD7H are assigned to the RSTm, the code FFD8H is assigned to the SOI marker, and the code FFD9h is assigned to the EOI marker.

This header enables the markers to be discriminated from the compressed and coded bit stream.

However, there is some possibility of a code matching with FFh appearing in the compressed and coded data at the time of entropy coding. Therefore, in the encoding apparatus, a byte 00h (hereinafter called a "byte stuff") is added to the data FFh to distinguish it from a marker.

Summarizing the problems in the present invention, when generating a compressed and coded stream of image data by the JPEG system, it is necessary to insert various markers, byte stuffs, and adjustment bits called "fill-bits" for suitably arranging the markers at the boundaries of the bytes into the compressed and coded bit stream. Such processing requires complex control and requires a register or FIFO memory or other memory of a considerable capacity.

Therefore, such a circuit for generating a data stream has the disadvantage of a complex configuration and large scale. This disadvantage becomes more serious for example when such a circuit is to be designed on an LSI. Improvement is therefore required.

SUMMARY OF THE INVENTION

An object of the present invention is to provide a data stream generation apparatus and a method of the same for generating a string of fixed length data of a predetermined bit length from a string of variable length data by a smaller scale circuit and simpler configuration and control by efficiently inserting the byte stuff and performing other processing.

Another object of the present invention is to provide a variable length coded data stream generation apparatus and a method of same for coding desired data by variable length coding to efficiently generate a predetermined data stream by a smaller scale circuit and simpler configuration and control by efficiently inserting the byte stuff and performing other processing.

Still another object of the present invention is to provide a camera system for photographing a desired image and coding the photographed image data by variable length coding which can code the photographed image data by variable length coding to efficiently generate an image data stream especially by a smaller scale circuit and simpler configuration and control.

According to a first aspect of the present invention, there is provided a data stream generation apparatus for generating a data stream including variable length data and predetermined control data, comprising a control data inserting means for inserting control data including first data having a predetermined first data pattern at a desired position in a string of variable length data, a first data combining means for successively combining the variable length data and the inserted control data, a fixed length data extracting means for successively extracting predetermined fixed length data from the combined data, a data pattern detecting means for detecting first data having the first data pattern other than the first data included in the control data from the extracted fixed length data, and output data selecting means for successively selecting output data from the fixed length data and, when first data other than the first data included in the control data is detected, selecting second data having a predetermined second data pattern immediately after the detected first data as the output data.

According to a second aspect of the present invention, there is provided a data stream generation method for generating a data stream including variable length data and predetermined control data comprising the steps of inserting control data including first data having a predetermined first data pattern at a desired position in a string of variable length data, successively combining the variable length data and the inserted control data, successively extracting predetermined fixed length data from the combined data, detecting first data having the first data pattern other than the first data included in the control data from the extracted fixed length data, successively selecting output data from the fixed length data and, when first data other than the first data included in the control data is detected, selecting second data having a predetermined second data pattern immediately after the detected first data as the output data, and successively outputting the output data with a fixed length.

According to a third aspect of the present invention, there is provided a variable length coded data stream generation apparatus for generating a data stream including variable length coded data and predetermined control data comprising a variable length coding means for coding desired data by variable length coding, a control data inserting means for inserting control data including first data having a predetermined first data pattern at a desired position in a string of variable length coded data, a first data combining means for successively combining the variable length coded data and the inserted control data, a fixed length data extracting means for successively extracting predetermined fixed length data from the combined data, a data pattern detecting means for detecting first data having the first data pattern other than the first data included in the control data from the extracted fixed length data, and an output data selecting means for successively selecting output data from the fixed length data, and, when first data other than the first data included in the control data is detected, selecting second data having a predetermined second data pattern immediately after the detected first data as the output data.

According to a fourth aspect of the present invention, there is provided a variable length coded data stream generation method for generating a data stream including variable length coded data and predetermined control data comprising the steps of coding desired data by variable length coding, inserting control data including first data having a predetermined first data pattern at a desired position in a string of variable length coded data, successively combining the variable length coded data and the inserted control data, successively extracting predetermined fixed length data from the combined data, detecting first data having the first data pattern other than the first data included in the control data from the extracted fixed length data, and successively selecting output data from the fixed length data and, when first data other than the first data included in the control data is detected, selecting second data having a predetermined second data pattern immediately after the detected first data as the output data, and successively outputting the selected output data.

According to a fifth aspect of the present invention, there is provided a camera system comprising a photographing means for photographing a desired image to generate image data, a variable length coding means for coding the generated image data by variable length coding, a control data inserting means for inserting control data including first data having a predetermined first data pattern at a desired position in a string of variable length coded image data, a first data combining means for successively combining the variable length coded image data and the inserted control data, a fixed length data extracting means for successively extracting predetermined fixed length coded image data from the combined data, a data pattern detecting means for detecting first data having the first data pattern other than the first data included in the control data from the extracted fixed length coded image data, an output image data selecting means for successively selecting output image data from the fixed length coded image data and, when first data other than the first data included in the control data is detected, selecting second data having a predetermined second data pattern immediately after the detected first data as the output image data, and a processing means for carrying out predetermined processing on a string of the selected output image data.

BRIEF DESCRIPTION OF THE DRAWINGS

These and other objects and features of the present invention will become more apparent from the following description of the preferred embodiments given with reference to the accompanying drawings, in which:

FIG. 15 is a view for explaining a select signal generated at a select signal generator of the data output unit shown in FIG. 14; and FIGS. 16A to 16I are views for explaining an operation of the data output unit shown in FIG. 14.

DESCRIPTION OF THE PREFERRED EMBODIMENTS

First Embodiment

Next, an explanation will be made of a first embodiment of the present invention by referring to the accompanying drawings.

In this embodiment, the present invention will be explained taking as an example a camera system such as an electronic still camera for photographing a still image and compressing, coding, and storing the image data.

First, an explanation will be made of the overall configuration and operation of the camera system by referring to FIG. 1.

Figure 1:
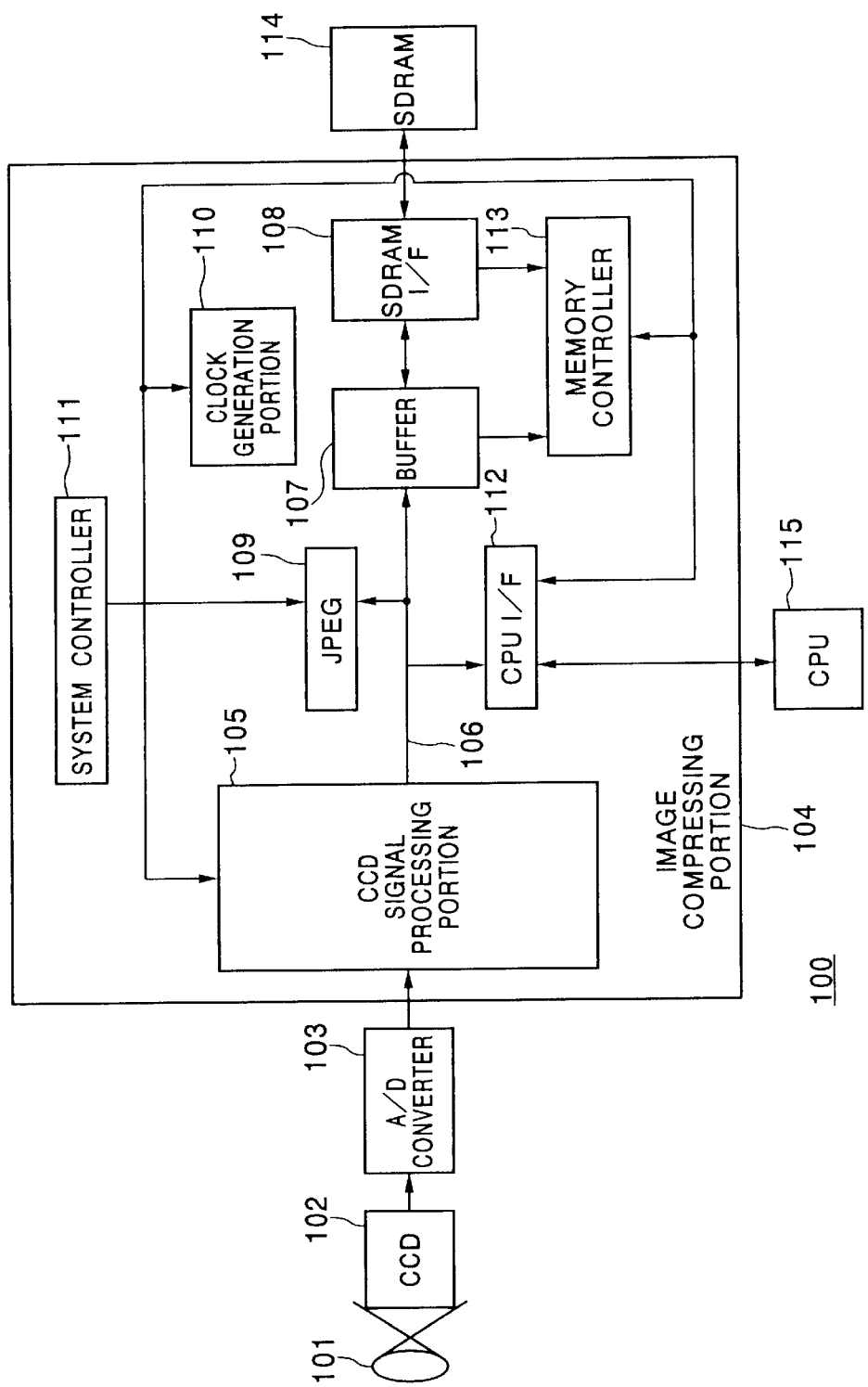
FIG. 1 is a block diagram of the configuration of a camera system of a first embodiment according to the present invention.

FIG. 1 is a block diagram of the configuration of the camera system 100 of the present embodiment.

The camera system 100 comprises an optical system 101, a charge-coupled device (CCD) 102, an analog/digital (A/D) converter 103, an image compressor 104, a static dynamic random access memory (SDRAM) 114, and a central processor (CPU) 115.

Further, the image compressor 104 comprises a CCD signal processor 105, a bus 106, a buffer 107, a SDRAM interface (SDRAM I/F) 108, a JPEG processor 109, a clock generator 110, a system controller 111, a CPU interface (CPU I/F) 112, and a memory controller 113.

The optical system 101 obtains a desired image based on the user's operation and focuses the optical signal on the imaging face of the CCD 102.

The CCD 102 converts the optical signal focused on the imaging face by the optical system 101 to an electric signal and outputs the signal to the A/D converter 103 as an analog image signal.

The A/D converter 103 converts the analog image signal input from the CCD 102 to a digital signal of a predetermined gradation and outputs the signal to the CCD signal processor 105 of the image compressor 104.

The CCD signal processor 105 of the image compressor 104 divides the input digital image signal to three color signals of R (red), G (green), and B (blue) under the control of the system controller 111, carries out gamma compensation on each of the color signals for preproduction of the colors, and generates a luminance signal and a color difference signal. The image signal including the generated luminance signal and color difference signal is output to the buffer 107 through the bus 106.

The buffer 107 successively stores the image signals input from the CCD signal processor 105 through the bus 106. When a predetermined amount is stored, it outputs the stored data to the SDRAM I/F 108 under the control of the memory controller 113.

The SDRAM I/F 108 is an external memory of the image compressor 104 and stores predetermined units of the image data input from the buffer 107 in the SDRAM 114 under the control of the memory controller 113. Further, it reads out the image data stored in the SDRAM 114 in 8×8 block units and outputs the read data to the buffer 107.

The JPEG processor 109 encodes by the JPEG system the image signal read out from the SDRAM 114 and input through the buffer 107 under the control of the system controller 111 to generate an encoded bit stream and outputs the bit stream to the CPU 115 through the bus 106 and the CPU I/F 112. The configuration and the operation of the JPEG processor 109 will be explained later in detail.

The clock generator 110 generates a clock to be used in each unit in the image compressor 104 under the control of the system controller 111 and provides the clock to each unit.

The bus 106 is shown schematically as a data bus in the image compressor 104. This bus 106 is used to transfer the image data from the CCD signal processor 105 to the buffer 107 and from the buffer 107 to the JPEG processor 109 and to transfer the encoded bit stream from the JPEG processor 109 to the CPU I/F 112.

The system controller 111 operates under the control of the CPU 115 and controls each unit of the image compressor 104 so that the operations of the image compressor 104 such as the storage of the input image data into the SDRAM 114, the transfer of the image data stored in the SDRAM 114 to the JPEG processor 109, the JPEG encoding in the JPEG processor 109, and the output of the encoded image data to the CPU 115 are carried out suitably.

The CPU I/F 112 is an interface with the CPU 115 for the input of the control signal and the image signal from the CPU 115 and the output of the control signal and the encoded data to the CPU 115.

The memory controller 113 controls the buffer 107 and the SDRAM I/F 108 under the control of the system controller 111 to control the storage of the image data into the SDRAM 114 and the reading of the image data stored in the SDRAM 114.

The SDRAM 114 is a memory for temporarily storing the image data including the photographed luminance signal and color difference signal. The image data photographed by the optical system 101 and the A/D converter 103 is temporarily stored in the SDRAM 114, then successively supplied to the JPEG processor 109, encoded, and output to the CPU 115 for use for storage, display, and transfer.

The CPU 115 controls each unit of the camera system 100 so that the photographing of the desired image, the image processing, the storage and reproduction of the image data, the JPEG encoding, the storage, display, and transmission of the JPEG encoded data, etc. by the optical system 101 to the image compressor 104 and the SDRAM 114 are carried out suitably and the camera system 100 operates desirably as a whole.

In a camera system 100 with such a configuration, first, when a desired image is photographed by the optical system 101 by a user operation, the optical signal of the image is converted to an electric signal by the CCD 102 to generate an image signal. The image signal is converted from an analog signal to a digital signal at the A/D converter 103 and further divided to color signals at the CCD signal processor 105 of the image compressor 104. Then, after the gamma compensation, the signals are converted to an image signal including a luminance signal and color difference signal.

This image signal is temporarily stored in the SDRAM 114 through the buffer 107 and the SDRAM I/F 118, then successively read out for every 8×8 pixel block and input to the JPEG processor 109.

The JPEG processor 109 encodes the image data successively input in every block by JPEG encoding to generate a JPEG encoded data stream of a predetermined format and outputs the data stream to the CPU 115 through the CPU I/F 112 for storage, display, transmission, etc.

Next, the internal configuration and the operation of the JPEG processor 109 of the camera system 100 will be explained by referring to FIG. 1 and FIG. 3.

Figure 2:
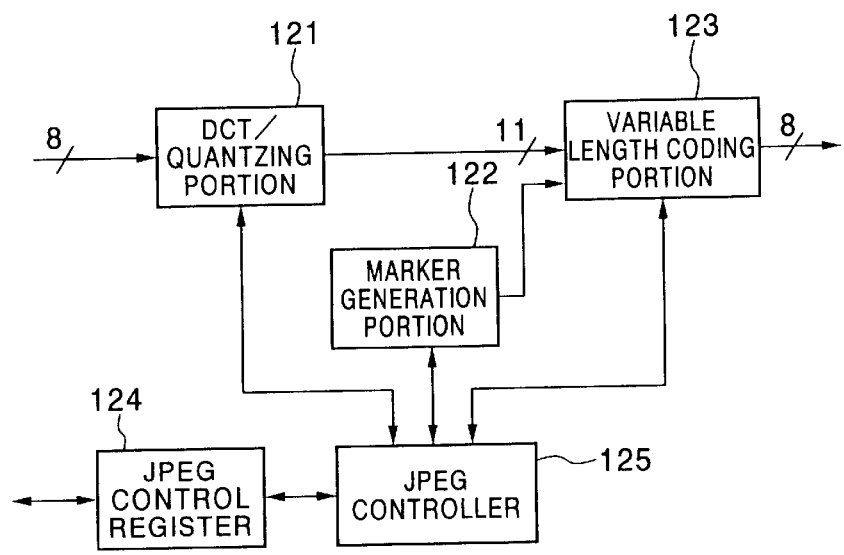
FIG. 2 is a block diagram of the configuration of a JPEG processor of the camera system shown in FIG. 1.

FIG. 2 is a block diagram of the configuration of the JPEG processor 109.

The JPEG processor 109 comprises a DCT/quantizing unit 121, a marker generator 122, a variable length coder 123, a JPEG control register 124, and a JPEG controller 125.

Note that the JPEG processor 109 receives as input a luminance signal of 8 bits per pixel and a color difference signal of 8 bits per pixel in 8×8 pixel units.

The DCT/quantizing unit 121 performs DCT on the input 8×8 pixel image data to convert it to 64' frequency components (DCT coefficients) and quantizes the coefficients using corresponding values in a not shown quantizing table. The quantized DCT coefficients (11 bits) are output to the variable length coder 123.

The marker generator 122 generates a marker for clearly defining the structure of the bit stream to be added to the JPEG bit stream under the control of the JPEG controller 125 and outputs it to the variable length coder 123.

The variable length coder 123 codes the DCT coefficients input from the DCT/quantizing unit 121 by variable length coding, converts the variable length coded data, added bit data, and markers input from the marker generator 122 to a bit stream of 8-bit units, and outputs the result from the JPEG processor 109.

Figure 3:
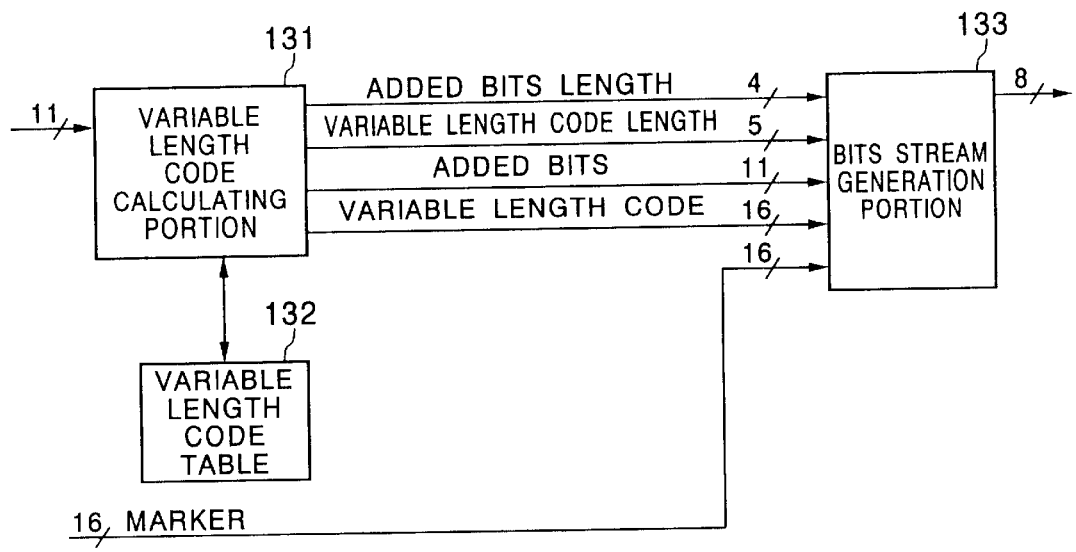
FIG. 3 is a block diagram of the configuration of a variable length coder of the JPEG processor shown in FIG. 2.

The configuration of this variable length coder 123 is shown in FIG. 3.

FIG. 3 is a block diagram of the configuration of the variable length coder 123.

The variable length coder 123 comprises a variable length code calculator 131, a variable length code table 132, and a bit stream generator 133.

The variable length code calculator 131 detects variable length coded data corresponding to the magnitude of the DCT coefficients and code length data of the variable length coded data based on the quantized DCT coefficients input from the DCT/quantizing unit 121 by referring to the variable length code table 132. Further, it detects added bit data from the magnitudes of the DCT coefficients and data length data of the added bit data. The detected data of the variable length coded data, the added bit data, the code length data of the variable length coded data, and the data length data of the added bit data are output to the bit stream generator 133.

Note that the variable length coded data is 2- to 16-bit data, while the added bit data is 0- to 11-bit data. Accordingly, the code length data and the data length data are respectively 5-bit and 4-bit data.

The variable length code table 132 is a coding table for variable length coding.

The bit stream generator 133 converts variable length data input from the variable length code calculator 131, that is, the variable length coding data and the added bit data, a string of data of an 8-bit fixed length by referring the code length data of the variable length coded data and the data length data of the added bit data input from the variable length code calculator 131, adds the marker input from the marker generator 122, to the the string of of data and outputs them as a coded bit stream.

The JPEG control register 124 of The JPEG processor 109 is a register in which data and parameters for controlling the operation of the DCT/quantizing unit 121 and the variable length coder 123 are set. These are set by the CPU 115 through the CPU I/F 112.

The JPEG controller 125 controls the operation of the DCT/quantizing unit 121, the marker generator 122, and the variable length coder 123 based on the data and the parameters set in the JPEG control register 124 so that the processing such as the DCT, the generation of the marker, the variable length coding, and the generation of the bit stream are suitably carried out.

In the JPEG processor 109 having such configuration, the operating conditions are set from the CPU 115 in the JPEG control register 124. Due to this, the JPEG controller 125 controls the DCT/quantizing unit 121 and the variable length coder 123 for the processing.

That is, the DCT/quantizing unit 121 performs DCT on and quantizes the successively input 8×8 pixel image data.

The quantized DCT coefficients are coded by the variable length coding at the variable length code calculator 131 of the variable length coder 123 to generate the variable length coded data and the added bit data.

Then, the variable length data, that is, the variable length coded data and the added bit data, is converted to a string of 8-bit fixed length data at the bit stream generator 133 which is output as the JPEG coded data stream.

Next, an explanation will be made in detail of the bit stream generator 133 of the variable length coder 123 according to the present invention in the JPEG processor 109 by referring the FIG. 4 to FIG. 9.

First, the configuration of the bit stream generator 133 will be explained.

Figure 4:
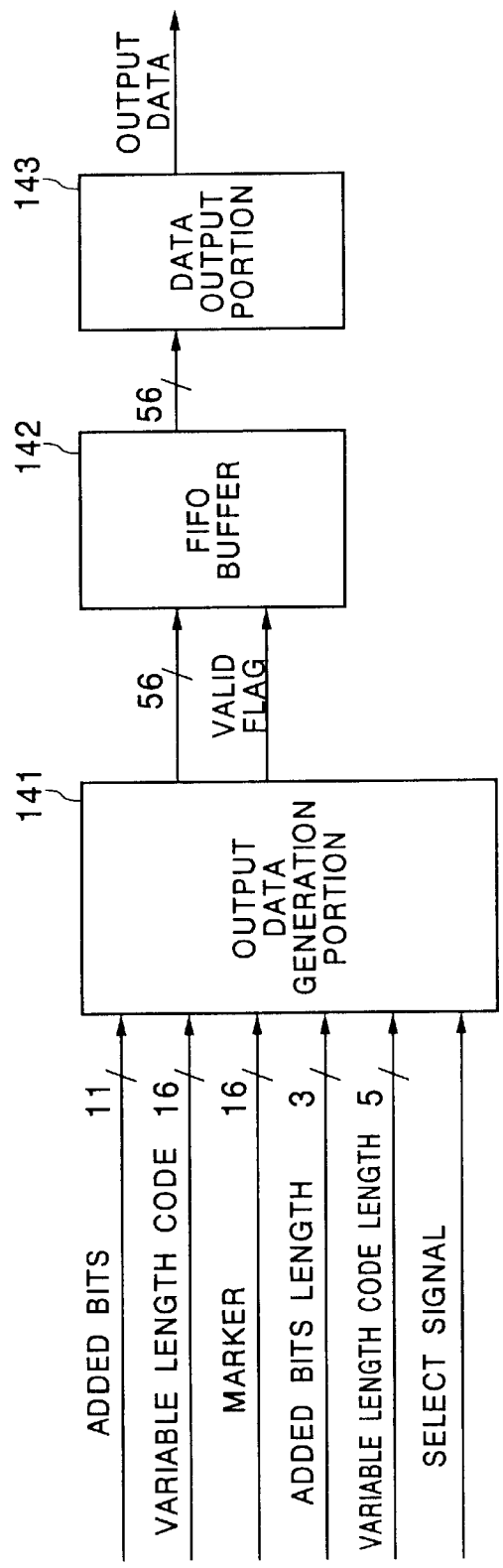
FIG. 4 is a block diagram of the configuration of a bit stream generator of the variable length coder shown in FIG. 3.

FIG. 4 is a view of the configuration of the bit stream generator 133.

The bit stream generator 133 has an output data generator 141, a FIFO buffer 142, and a data output unit 143.

The output data generator 141 successively combines the variable length data input from the variable length code calculator 131, that is, the variable length coded data and the added bit data, by referring to the length data of the variable length coded data and the length data of the added bit data also input from the variable length calculator 131, further, inserts a marker suitably input from the marker generator 122 into the combined data, and outputs the data in 56-bit units to the FIFO buffer 142. Further, at that time, it generates a valid flag indicating whether valid data is output or not and similarly outputs it to the FIFO buffer 142.

At this time, while a byte FFh appears in the compressed (coded) data, the output data generator 141 inserts a byte stuff 00h to distinguish the data from the marker just after the byte FFh.

Further, since the marker is comprised of 2 bytes of data and needs to be arranged exactly at the boundary of the bytes, when the data just before the marker does not finish at the boundary of the bytes, the space is filled by the fill bits.

The FIFO buffer 142 is a memory for temporarily storing data of 56 bits output from the output data generator 141. The FIFO buffer 142 stores the data output from the output data generator 141 when the valid flag also input from the output data generator 141 is valid. The stored data is successively read out by the data output unit 143.

The data output unit 143 successively reads the data from the FIFO buffer 142, generates a string of data of 8-bit units, and successively outputs it adjusted to the external transmission format.

The configuration of the output data generator 141 will be explained next in more detail.

Figure 5:
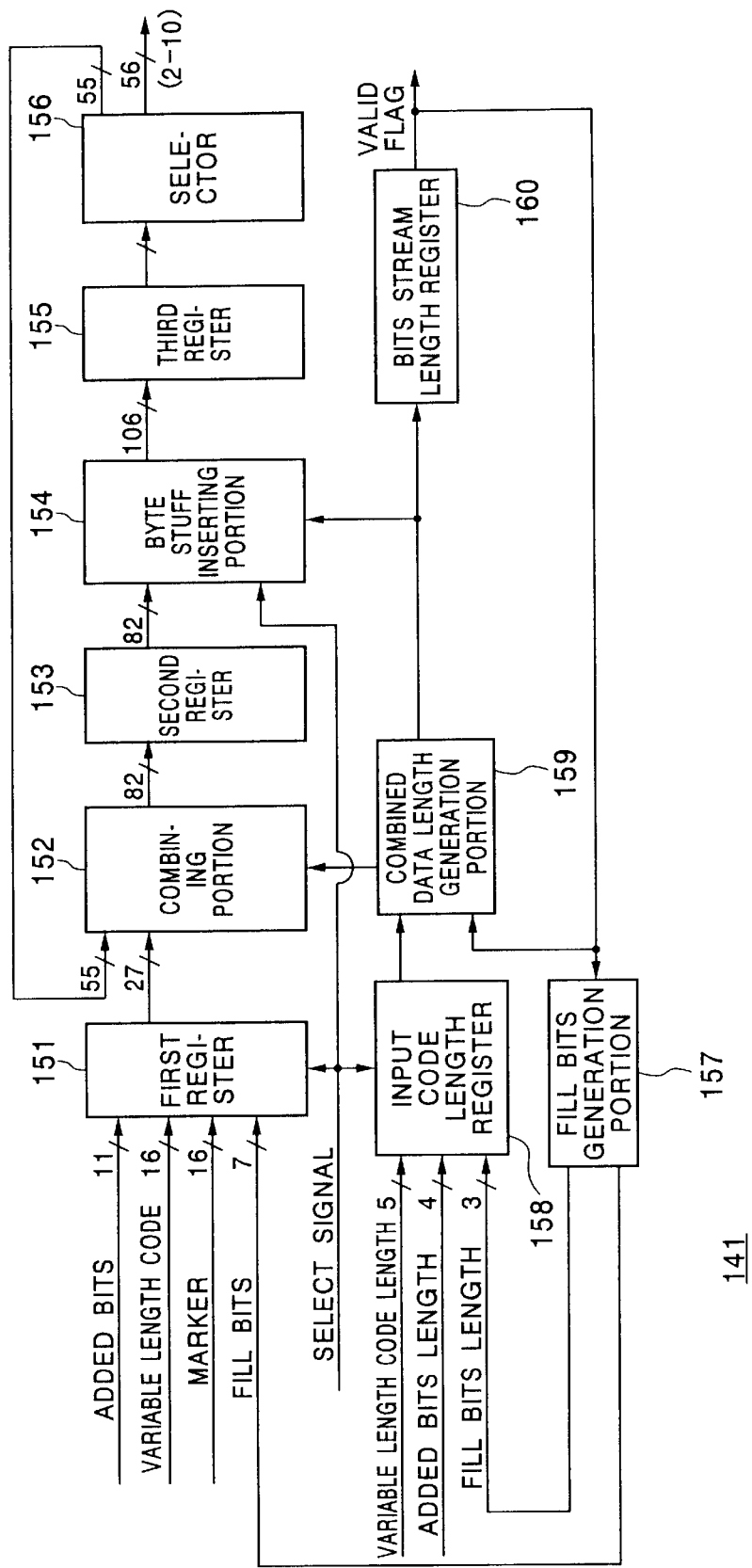
FIG. 5 is a block diagram of an output data generator of the bit stream generator shown in FIG. 4.

FIG. 5 is a block diagram of the configuration of the output data generator 141.

The output data generator 141 comprises a first register 151, a combiner 152, a second register 153, a byte stuff inserter 154, a third register 155, a selector 156, a fill bit generator 157, an input code length register 158, a combined data length generator 159, and a bit stream length register 160.

The first register 151 temporarily stores the variable length coded data and the added bit data input from the variable length code calculator 131, the marker input from the marker generator 122, and the fill bits input from the fill bit generator 157 described later and outputs the same to the combiner 152.

The first register 151 stores either the combination of the variable length coded data and the added bit data or the combination of the fill bits and the marker in response to the select signal input from the outside.

Since the variable length coded data is a maximum of 16 bits and the added bit data is a maximum of 11 bits, the combination of these is a maximum of 27 bits. Further, since the marker is 16 bits and the fill bits is a maximum of 7 bits, which is 1 bit short of 1 byte, the combination of these marker and fill bits is a maximum of 23 bits. Accordingly, the first register 151 should have a storage capacity of 27 bits.

The combiner 152 combines the data read out and newly input from the first register 151 and the remaining data already input and fed back without being output from the output data generator 141 and outputs the result to the second register 153.

Figure 6:
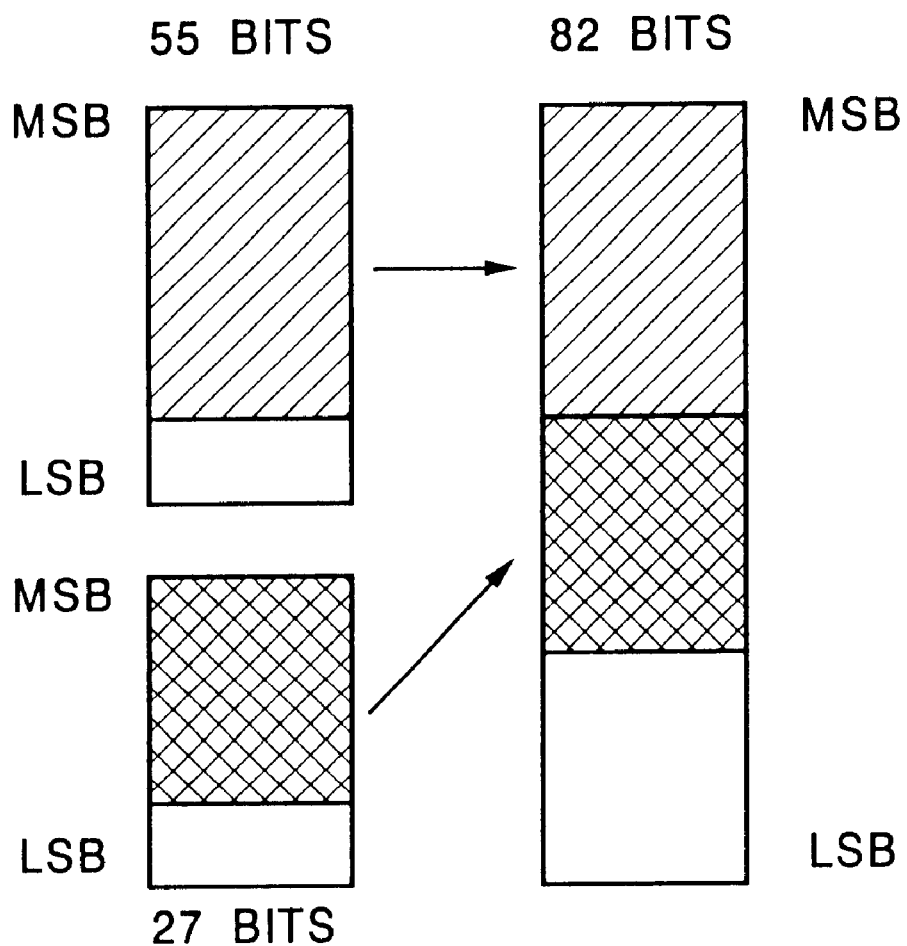
FIG. 6 is a view for explaining an operation of a combiner of the output data generator shown in FIG. 5.

Specifically, the combiner 152 combines these two data, as shown in FIG. 6, by shifting the feedback data toward the MSB side based on the combined data length input from the combined data length generator 159, shifting the newly input data to a position continuing from the shifted fed back data, and obtaining the OR (logical sum) of these data.

Note that, as described later, because the unit of the data output from the output data generator 141 is 56 bits and the data input from the first register 151 is a maximum of 27 bits, the combined data is a maximum of 82 bits.

The second register 153 temporarily stores the data of the maximum 82 bits combined at the combiner 152 and successively outputs it to the byte stuff inserter 154 in response to a request.

The byte stuff inserter 154 successively reads out the data stored in the second register 153, detects the data FFh from every byte of the variable length coded data and the added bit data, and inserts the byte stuff 00h for discrimination from the marker immediately after the data FFh. Note that, if it detects the data FFh from the fed back data, it does not insert the byte stuff 00h.

Here, consider the case where the byte stuff 00h is inserted most often.

Figure 7:
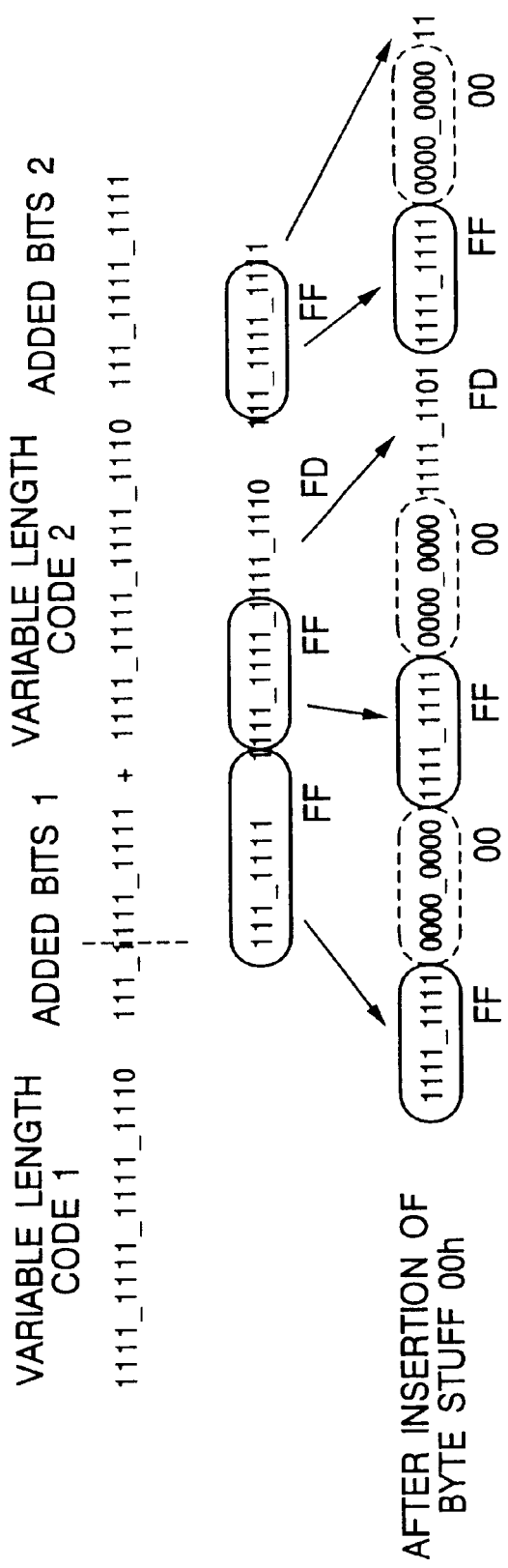
FIG. 7 is a view for explaining the largest amount of insertion of byte stuffs in a byte stuff inserter of the output data generator shown in FIG. 5.

The case where the byte stuff 00h is inserted most often is, as shown in FIG. 7, the case where the combination of the variable length coded data "1111 1111 1111 1110b" ("b" indicates a binary numeral) and the added bit data "111 1111 1111b" is input continuously.

Note that, because the byte stuff 00h is not inserted in the data FFh of the fed back bit stream without being output from the output data generator 141, the processing for inserting the byte stuff to the 7 bits of the LSB side of the first added bit data (added bits 1), that is, "111 1111b", and the second variable length coded data and added bit data is the maximum amount of processing in one byte stuff inserting processing.

Further, in that case, as shown in FIG. 7, there are three FFhs at the boundaries of the bytes, so three byte stuffs 00hs are inserted.

In this way, because the byte stuff inserter 154 inserts the maximum three byte stuffs, that is, the maximum 24 bits of data, the data generated in the byte stuff inserter 154 becomes a maximum 106 (=82+24) bits.

Figure 8:
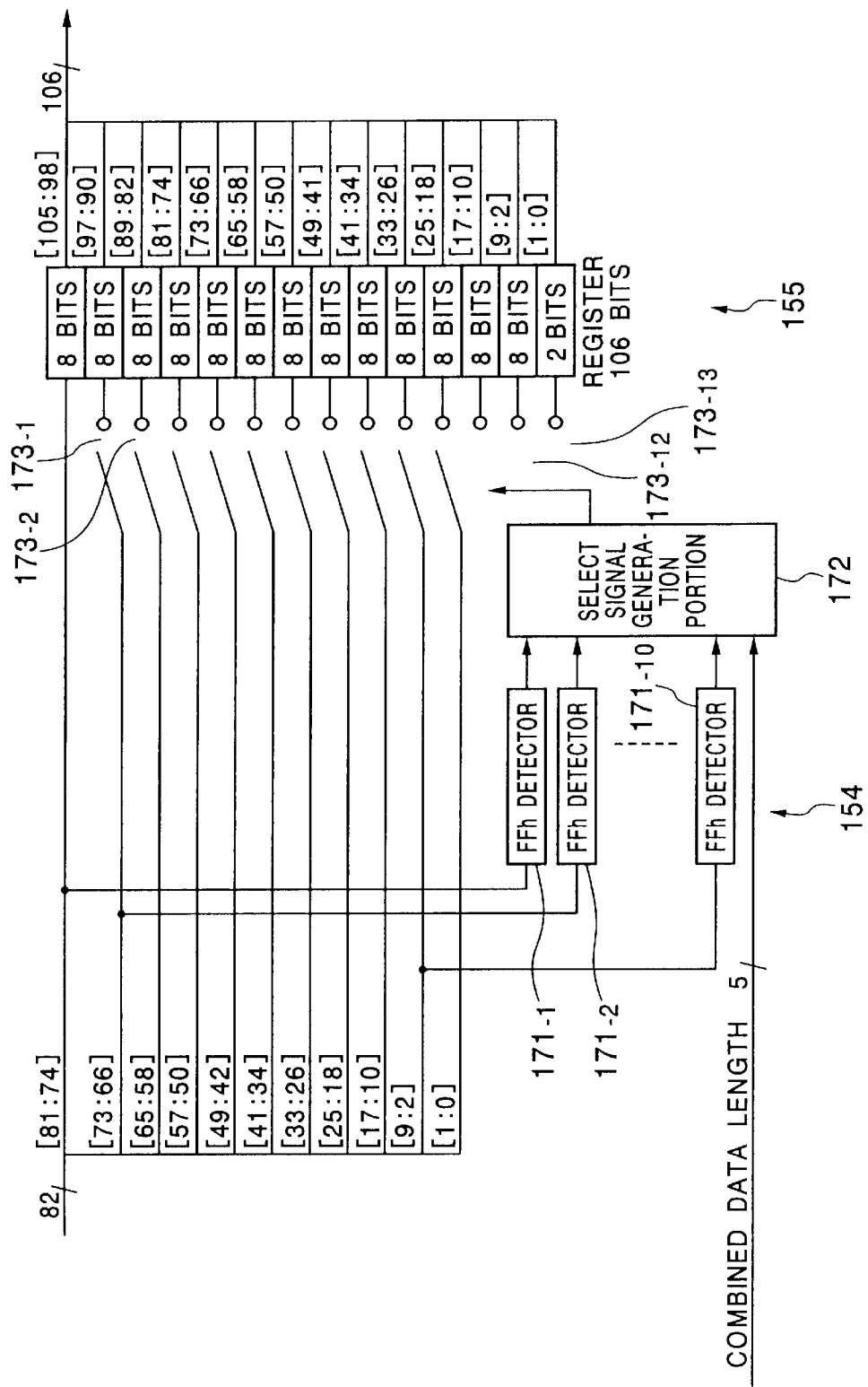
FIG. 8 is a block diagram of the configuration of the byte stuff inserter of the output data generator shown in FIG. 5.

An example of the concrete configuration of the byte stuff inserter 154 is shown in FIG. 8.

As shown in FIG. 8, the byte stuff inserter 154 comprises FF detectors $171_{-1}$ to $171_{-10}$, a select signal generator 172, and switches $173_{-1}$ to $173_{-13}$.

The FF detectors $171_{-1}$, to $171_{-10}$ detect the FFh from every 8 bits, that is, every byte, of the MSB side to the LSB side in the 82 bits of data stored in the second register 153 and output the detection result to the select signal generator 172.

The select signal generator 172 detects the insertion position of the byte stuff 00h and an accompanying shift of each byte of data based on the FFh detection result input from the FF detectors $171_{-1}$, to $171_{-10}$, generates switching signals for selecting output data for every byte of the 106 bits of output data, and applies the switching signals to the switches $173_{-1}$ to $173_{-13}$.

The switches $173_{-1}$ to $173_{-13}$ select output data for each byte of the 106 bits of data output from the select signal generator 172 based on the switching signals from the select signal generator 172.

The first byte of the MSB side of the 82 bits of data stored in the second register 153, that is, the data from bit 74 to bit 81, is output as it is as MSB side data without regard as to the existence of the byte stuff. For this reason, no switch is provided for this byte. It is output as the highest byte of the output data, that is, the data from bit 98 to bit 105.

The second byte of the output data, that is, the data from bit 90 to bit 97, becomes the byte stuff 00h if the highest byte is FFh and becomes the data from bit 66 to bit 73 of the input data if the highest byte is not FFh. For this reason, either data is selected by the switch $173_{-1}$ as the second byte.

The third byte of the output data, that is, the data from bit 82 to bit 89, is determined at the switch $173_{-3}$ by selecting any one of the third byte (bit 58 to bit 65) of the input data, the second byte (bit 66 to bit 73) of the input data, and the byte stuff 00h based on whether the highest byte and the second highest byte are respectively FFh or not.

The fourth byte of the output data is similarly determined by selecting one of the three types of data of the two bytes of the input data and the byte stuff 00h.

In the same way, if considering the various cases where FFh appears in the higher byte and a byte stuff is inserted, the fifth byte and sixth byte of the output data are respectively determined by selecting one of four types of data of three bytes of the input data and the byte stuff 00h, while the seventh and higher bytes of the output data are respectively determined by selecting one of five types of data of four bytes of the input data and the byte stuff 00h.

Further, as the last 2 bits at the LSB side, the 2 bits of the LSB side of the input data are selected when three byte stuffs are inserted in higher bytes.

In the byte stuff inserter 154, the byte stuff is suitably inserted into the data by these circuits, whereby a maximum of 106 bits of data is generated and successively output to the selector 156.

The third register 155 temporarily stores the maximum 106 bits of data generated in the byte stuff inserter 154 and successively outputs the data to the selector 156.

Figure 9:
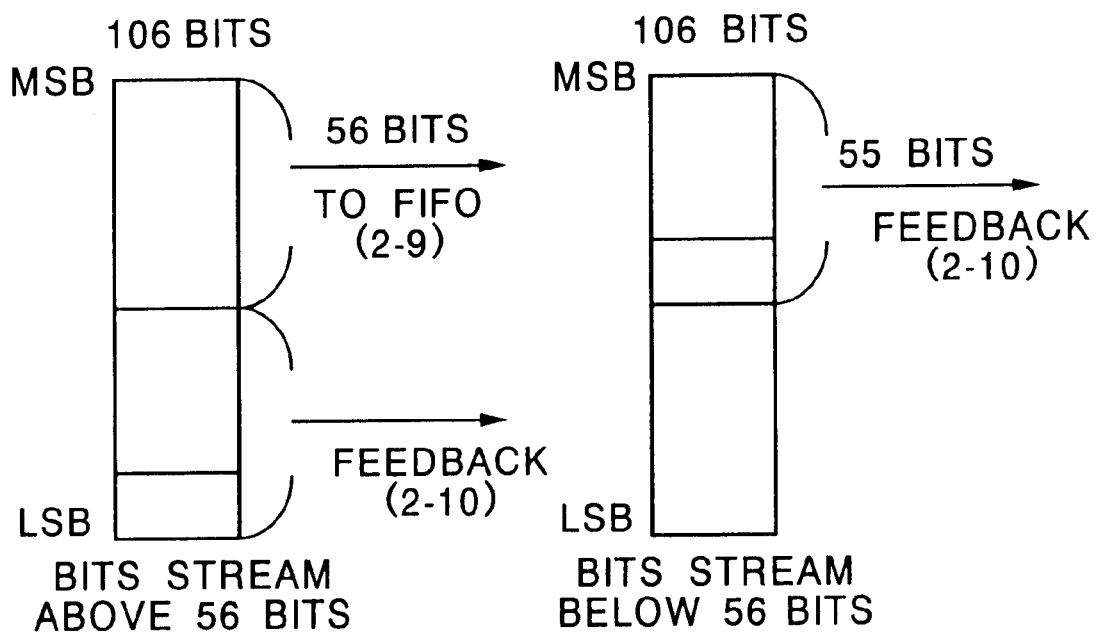
FIG. 9 is a view for explaining an operation of a selector of the output data generator shown in FIG. 5.

The selector 156 reads out the data stored in the third register 155 as shown in FIG. 9. If equal to or more than 56 bits, it outputs the 56 bits of the MSB side and outputs it to the FIFO buffer 142. The remaining data is fed back to the combiner 152. If the data stored in the third register 155 is less than 56 bits, all of the bits are fed back to the combiner 152.

Note that the maximum length of the data processed one time is 51 bits comprised of the maximum 27 bits of input data plus the three byte stuffs 00hs inserted there. This becomes 56 bits by rounding the 51 bits up to byte units. Accordingly, the selector 156 outputs the data in 56-bit units.

The fill bit generator 157 detects the number of bits of the fraction for rounding up the data length to byte units based on the data length of the bit stream data input from the bit stream length register 160, generates fill bits corresponding to the detected number of bits, and output the fill bits to the input code length register 158.

The input code length register 158 calculates a data length of either the combination of the variable length coded data and the added bit data or the combination of the fill bits and the marker, newly input and stored in the first register 151, based on the code length of the variable length coded data and the data length of the added bit data input from the variable length code calculator 131 or the fill bit length and the marker length (16 bits) input from the fill bit generator 157 described later. Then, it outputs the data length to the first register 151 and the combined data length generator 159. Which combination of the data is input is detected from the select signal input from the outside.

The combined data length generator 159 calculates the data length of the data obtained by combination in the combiner 152 based on the data length of the newly input data stored in the input code length register 158 and the data length of the fed back remaining data stored in the bit stream length register 160 and outputs the result to the combiner 152, the byte stuff inserter 154, and the bit stream length register 160.

The bit stream length register 160 detects and stores the data length of the generated bit stream data based on the data length of the combined data input from the combined data length generator 159 and the data length of the byte stuff 00h inserted at the byte stuff inserter 154. The stored data length of the bit stream is referred to by the fill bit generator 157 and the combined data length generator 159.

Further, if the data length is equal to or more than 56 bits, the bit stream length register 160 generates and outputs a valid flag indicating that valid data is output from the output data generator 141.

Next, an explanation will be made of the operation of the bit stream generator 133.

The variable length coded data and the added bit data generated at the variable length code calculator 131 are input to the output data generator 141 of the bit stream generator 133. The variable length coded data and the added bit data are combined by being stored into the first register 151. The combined data is further combined with the already input data at the combiner 152 as shown in FIG. 6.

From the data combined at the combiner 152, the byte having the value of FFh is detected at the byte stuff inserter 154 configured as shown in FIG. 8. If the byte FFh is detected, the byte stuff 00h is inserted immediately after of the byte FFh of the combined data. The combined data in which the byte stuff 00h is suitably inserted is stored in the third register 155.

Further, in the case when a marker is generated at the marker generator 122, it is combined with the fill bits generated at the fill bit generator 157 at the output data generator 141 of the bit stream generator 133 and the result is further combined with the already input data at the combiner 152.

In this case, a byte stuff 00h is not inserted at the byte stuff inserter 154. The combined data is stored in the third register 155 as it is.

Then, if the data length of the data stored in the third register 155 is equal to or more than 56 bits, as shown in FIG. 9, the 56 bits of the MSB side of the data are selected by the selector 156, output from the output data generator 141, and temporarily stored in the FIFO buffer 142.

Further, the data when the data length is less than 56 bits or the remaining data after the extraction of the 56 bits of data is fed back to the combiner 152 and combined with the next input data.

The data stored in the FIFO buffer 142 is successively read out from the data output unit 143, divided into 8-bit units of data, and output in a predetermined format.

In this way, the JPEG processor 109 according to the present embodiment suitably adds a marker to the variable length coded data and the added bit data obtained by the variable length coding in the variable length code calculator 131 and further suitably adds a byte stuff to data having the value of FFh to enable suitable generation of a JPEG data stream.

Consequently, it is possible to provide a camera system 100 obtaining a photographed image as a signal compressed and coded by the JPEG system.

Second Embodiment

Next, an explanation will be made of a second embodiment according to the present invention by referring FIG. 10 to FIGS. 16A to 16I.

In the camera system of the first embodiment explained above, the configuration of the bit stream generating unit 133 is complex, so there are requests to simplify the configuration more. Therefore, a camera system having a simpler configuration will be explained as a second embodiment according to the present invention.

The overall configuration and operation of the camera system of the present embodiment, the internal configuration and operation of the JPEG processor, and the configuration of the variable length coder and so on are as same as those of the camera system 100 of the first embodiment mentioned above, so explanations of those will be omitted.

Next, an explanation will be given of the characterizing feature of this embodiment, that is, the bit stream generator 133b in the variable length coder 123.

First, the configuration of the bit stream generator 133b will be explained by referring to FIG. 10 to FIG. 15.

Figure 10:
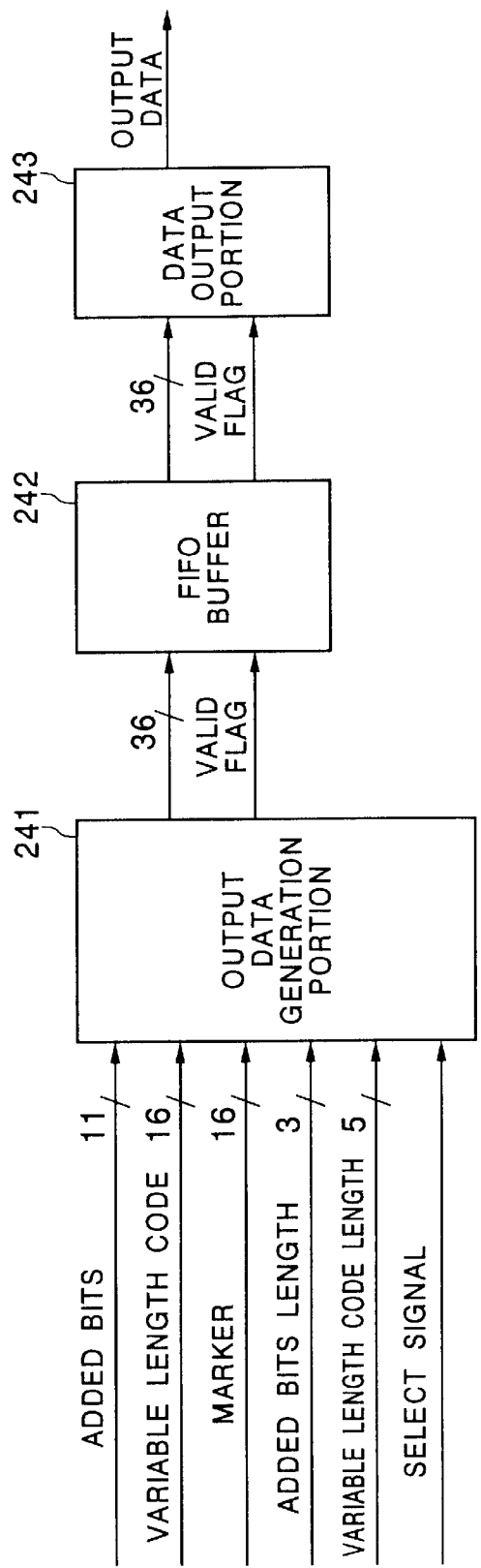
FIG. 10 is a block diagram of the configuration of a bit stream generator of a second embodiment according to the present invention.

FIG. 10 is a block diagram of the configuration of the bit stream generator 133b.

The bit stream generator 133b comprises an output data generator 241, an FIFO buffer 242, and a data output unit 243.

The output data generator 241 successively combines the variable length data input from the variable length code calculator 131, that is, the variable length coded data and the added bit data, by referring to the length data of the variable length coded data and the length data of the added bit data also input from the variable length calculator 131, and further inserts the marker suitably input from the marker generator 122 into the combined data to generate a 32-bit data stream.

At this time, when a byte FFh appears in the compressed (coded) data, the byte stuff 00h is not inserted for distinguishing the data from the marker. 4-bit marker position information is generated to differentiate between the FFh of the data and the FFh of the marker.

The output data generator 241 adds this 4-bit marker position information to the higher position of the 32-bit data stream to generate 36 bits of data and outputs this to the FIFO buffer 242.

At the time, the output data generator 241 generates a valid flag indicating whether any valid data is output or not and similarly outputs the flag to the FIFO buffer 242.

Further, fill bits for arrangement at the position of the boundary of bytes are inserted in the same way as the output data generator 141 of the first embodiment.

Further, which combination is processed, the combination of the variable length coded data and the added bit data or the combination of the fill bits and the marker, is selected in response to the select signal input from the outside.

The configuration of the output data generator 241 will be explained in more detail by referring to FIG. 11.

Figure 11:
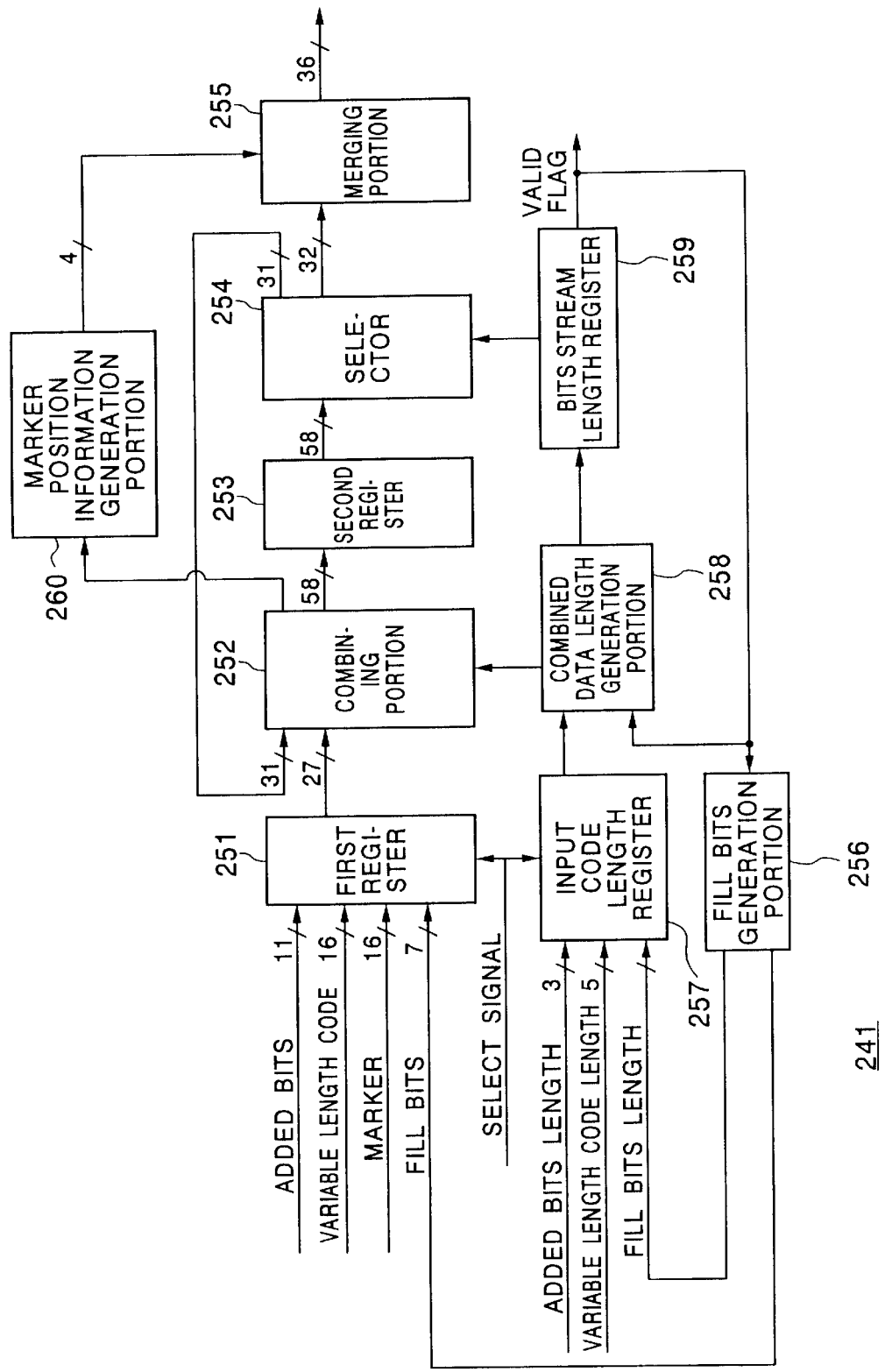
FIG. 11 is a block diagram of the configuration of output data generator of the bit stream generator shown in FIG. 10.

FIG. 11 is a block diagram of the configuration of the output data generator 241.

The output data generator 241 comprises a first register 251, a combiner 252, a second register 253, a selector 254, a merging unit 255, a fill bit generator 256, an input code length register 257, a combined data length generator 258, a bit stream length register 259, and the marker position information generator 260.

The first register 251 temporarily stores the variable length coded data and the added bit data input from the variable length code calculator 131, the marker input from the marker generator 122, and the fill bits input from the fill bit generator 157 described later and outputs them to the combiner 252.

The first register 251 stores either the combination of the variable length coded data and the added bit data or the combination of the fill bits and the marker in response to the select signal input from the outside.

The storage capacity of the first register 251 need only be 27 bits in the same way as the first register 151 of the first embodiment.

The combiner 252 combines the newly input data read out from the first register 251 and the remaining data already input and fed back without being output from the output data generator 241 and outputs the combined data to the second register 253.

Specifically, the combiner 252 combines these two data by shifting the fed back data toward the MSB side based on the combined data length input from the combined data length generator 258, shifting the newly input data to a position continuing from the shifted fed back data, and obtaining the OR (logical sum) of these data.

Further, the combiner 252 outputs the marker position information indicating the position of the marker when combining the marker.

Note that, because the unit of the data output from the output data generator 241 as described later is 32 bits, the fed back remaining data is a maximum of 31 bits. Since the data input from the first register 251 is a maximum of 27 bits, the combined data is a maximum of 58 bits.

The second register 253 temporarily stores the data of the maximum 58 bits combined at the combiner 252 and successively outputs it to the selector 254 in response to request.

The selector 254 reads out the data stored in the second register 253 and, if equal to or more than 32 bits, reads out the 32 bit data from the MSB and outputs it to the merging unit 255. The remaining data is fed back to the combiner 252. If the data length of the data stored in the second register 253 is less than 32 bits, all of the bits are fed back to the combiner 252.

Note that, the maximum length of the data processed at one time is 27 bits. This becomes 32 bits by rounding the 27 bits up to byte units. Therefore, the selector 254 outputs the data in 32-bit units.

The merging unit 255 merges the 4 bits of the marker position information input from the marker position information generator 260 with the higher side of the 32 bit data selected and input by the selector 254 to generate 36 bits of data and outputs the data to the FIFO buffer 242.

The fill bit generator 256 detects the number of bits of the fraction for rounding up the data length to byte units based on the data length of the bit stream data input from the bit stream length register 259, generates fill bits corresponding to the detected number of bits, and output the fill bits to the input code length register 257.

The input code length register 257 calculates a data length of either the combination of the variable length coded data and the added bit data or the combination of the fill bits and the marker, newly input and stored in the first register 251, based on the code length of the variable length coded data and the data length of the added bit data input from the variable length code calculator 131 or the fill bit length and the marker length (16 bits) input from the fill bits generator 256. Then, it outputs the data length to the first register 251 and the combined data length generator 258. Which combination of the data is input is detected from the select signal input from the outside.

The combined data length generator 258 calculates the data length of the data combined in the combiner 252 based on the data length of the newly input data stored in the input code length register 257 and the data length of the fed back remaining data stored in the bit stream length register 259 and outputs the result to the combiner 252 and the bit stream length register 259.

The bit stream length register 259 stores the data length of the combined data input from the combined data length generator 258. The stored data length of the bit stream is referred to by the fill bits generator 256 and the combined data length generator 258.

Further, if the data length is equal to or more than 32 bits, the bit stream length register 259 generates and outputs a valid flag indicating that valid data is output from the output data generator 241.

The marker position information generator 260 generates 4 bits of marker position information based on the position information at the time when the marker input from the combiner 252 is combined and outputs it to the merging unit 255.

Figure 12:
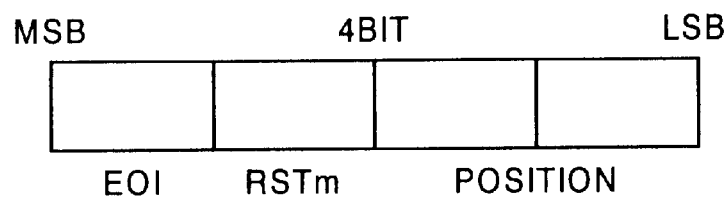
FIG. 12 is a view of the configuration of marker position information.

The marker position information is the 4 bits of data shown in FIG. 12. The higher 2 bits indicate the type of the marker, and the lower 2 bits indicate the position of the marker. In the present embodiment, the two kinds of markers of the marker EOI and the restart marker RSTm are considered as markers to be inserted into the data stream.

Figure 13:
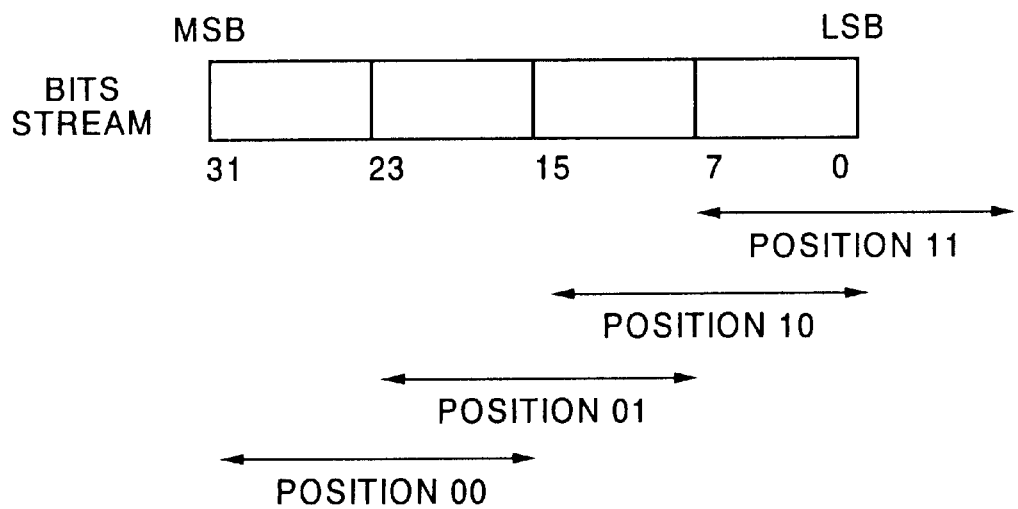
FIG. 13 is a view for explaining a code indicating a position of a marker in the marker position information shown in FIG. 12.

Accordingly, the bit 4 (MSB) indicates the existence of the EOI and the bit 3 indicates the existence of the RSTm. Further, the position of the marker is indicated, as shown in FIG. 13, by assigning a 2-bit code to the continuous 2 bytes in the 4 bytes (32 bits). That is, when the marker is at the position of the bits 31 to 16, 00*b* is given as the position information, when the marker is at the position of the bits 23 to 8, 01*b* is given, when the marker is at the position of the bits 15 to 0, 10*b* is given, and when only the bits above the marker are at the bits 7 to 0, 11*b* is given.

The above was an explanation of the configuration of the output data generator 241.

The FIFO buffer 242 of the bit stream generator 133*b* is a memory for temporarily storing the 36-bit units of data output from the output data generator 241. The FIFO buffer 242 stores the data output from the output data generator 241 when the valid flag also input from the output data generator 241 is valid.

The stored data is successively read out by the data output unit 243. Therefore, the FIFO buffer 242 outputs the valid flag to the data output unit 243 while the new valid data is stored.

The data output unit 243 successively reads out the data from the FIFO buffer 242, inserts the byte stuff 00h, generates a string of 8-bit units of data, and outputs it successively adjusted to the external transmission format.

The configuration and operation of the data output unit 243 will be explained in more detail by referring to FIG. 14 to FIG. 16I.

Figure 14:
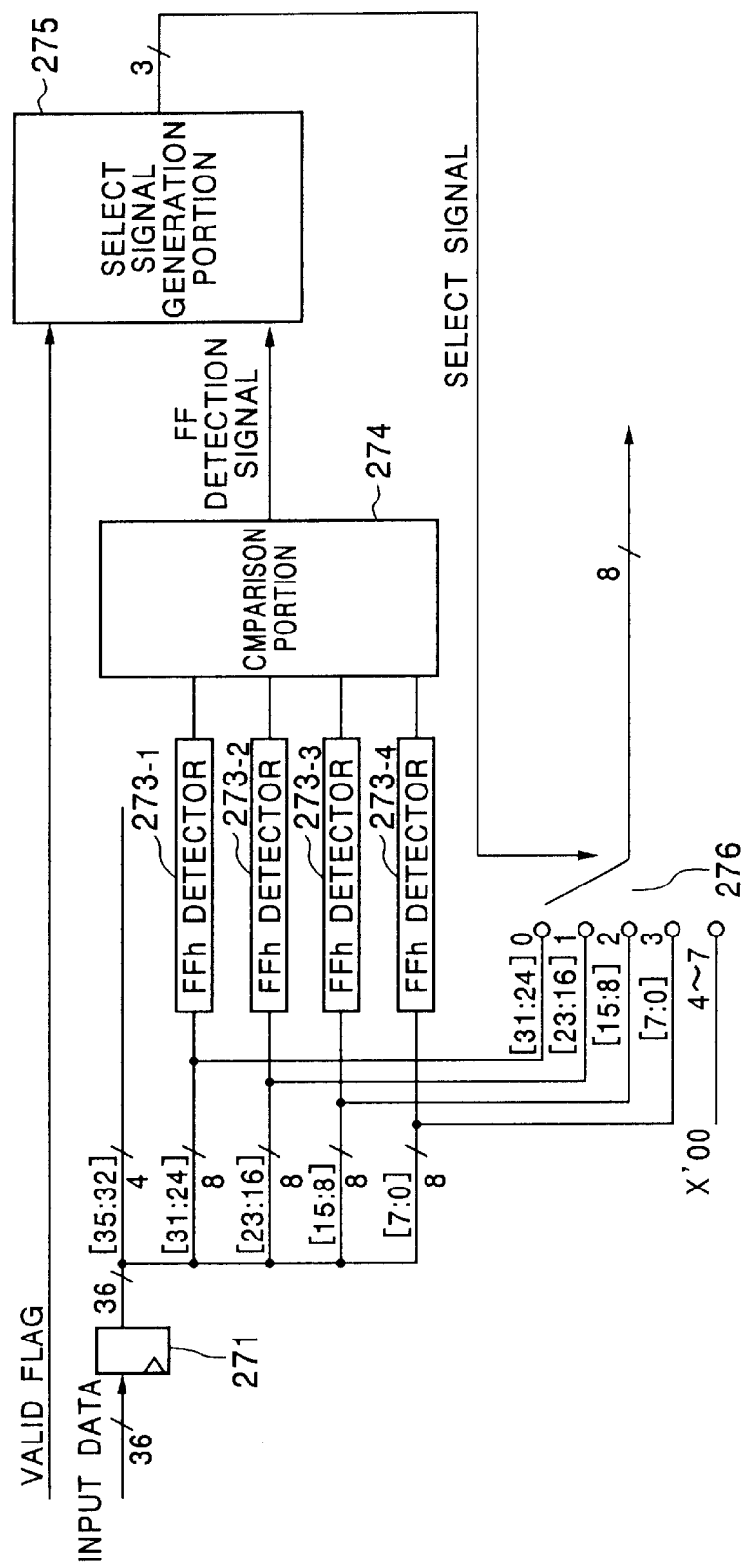
FIG. 14 is a block diagram of the configuration of a data output unit of the bit stream generator shown in FIG. 10.

FIG. 14 is a block diagram of the configuration of the data output unit 243.

The data output unit 243 comprises a register 271, first to fourth FF detectors $273_{-1}$ to $273_{-4}$, a comparator 274, a select signal generator 275, and a switch 276.

The register 271 stores the 36 bits of data read out from the FIFO buffer 242. The highest marker position information is output in a referable manner by the comparator 274. Each byte from the MSB side of the 32 bits of the data part is output in a referable manner by the first to fourth FF detectors $273_{-1}$ to $273_{-4}$ and the terminals 0 to 3 of the switch 276.

The first to fourth FF detectors $273_{-1}$ to $273_{-4}$ respectively detect whether the value of each byte of the data stored in the register 271 is FFh or not and output the results of the detection to the comparator 274.

The comparator 274 detects whether there is data FFh other than the marker by comparing the result of the detection of the data FFh input from the first to fourth FF detectors $273_{-1}$ to $273_{-4}$ and the marker position information input from the register 271 and outputs the result of the detection and the information indicating the position of the FFh other than the marker to the select signal generator 275.

The select signal generator 275 generates a select signal for selecting a byte to be output and applies the signal to the switch 276 while a valid flag which indicates that the data read out from the FIFO buffer 242 is valid is being input based on the result of the detection of a FFh other than the marker input from the comparator 274.

The select signal generator 275 generates a select signal which successively selects each byte of the data stored in the register 271 from the MSB side and is generated by a 2-bit counter counting up successively when there is no FFh other than the marker. Further, when there is an FFh other than the marker, it stops the counting up of the counter during one cycle and sets 1 to the third bit. The select signal generator 275 generates such a 3-bit select signal.

The switch 276 selects any one data from each byte of the data stored in the register 271 and the byte stuff 00h based on the select signal input from the select signal generator 275 and outputs the selected data as an output signal from the bit stream generator 133.

The relationship between the select signal and the selected bits is shown in FIG. 15. Note that, in FIG. 15, "3'bxxx" means 3-bit binary data.

The above was an explanation of the configuration of the data output unit 243.

Next, an explanation will be made of the operation of the bit stream generator 133b by referring to FIGS. 16A to 16I.

The variable length coded data and the added bit data generated at the variable length code calculator 131 are input to the output data generator 241 of the bit stream generator 133b. Then, the variable length coded data and the added bit data are combined by storing them in the first register 251, and the combined data is further combined with the already input data at the combiner 252.

Further, when a marker is generated by the marker generator 122, the marker is combined with the fill bits generated at the fill bit generator 256 at the output data generator 241 of the bit stream generator 133b, and the combined data is further combined with the already input data at the combiner 252.

In this case, the marker is detected from the data combined in the marker position information generator 260, and the 4-bit marker position information indicating the position of the marker as shown in FIG. 12 and FIG. 13 is generated.

Then, if the data length of the data combined and stored in the second register 253 is equal to or more than 32 bits, the 32 bits from the MSB of the data are selected by the selector 254, merged in the merging unit 255 with the marker position information generated in the marker position information generator 260, and output as 36 bits of data. This is temporarily stored in the FIFO buffer 242.

Further, the data when the data length is less than 32 bits or the remaining data after the extraction of the 32 bits of data is fed back to the combiner 252 and combined with the next input data.

The 36 bits of data stored in the FIFO buffer 242 are successively read out from the data output unit 243, given the byte stuff 00h, and output successively in 8-bit units.

The operation of the data output unit 243 will be explained concretely by referring to FIGS. 16A to 16I.

Now, when the data as shown in FIG. 16A is stored in the register 271, it is detected in each of the first to the fourth FF detectors $273_{-1}$ to $273_{-4}$ whether each byte of the data is FFh or not.

Then, the comparator 274 checks the result of the detection of the FFh for each byte successively from the MSB side in every cycle as shown in FIG. 16B in accordance with the output frequency of the data. As a result, as shown in FIG. 16C, it is detected that for example the second byte is FFh.

When the comparator 274 successively outputs the results of the detection to the select signal generator 275, the select signal generator 275 generates a select signal based on the result.

Basically, the select signal generator 275 generates a select signal shown in FIG. 16F, in which the 2 bits of the LSB side are successively counted up between 0 to 3 and the 1 bit of the MSB is "0" as shown in FIG. 16E. Then, when data FFh is detected, it stops the counting up of the 2 bits of the LSB side and sets "1" to the 1 bit of the MSB in the next cycle as shown in FIG. 16D. As a result, the select signal as shown in FIG. 16F is generated.

By providing them, the data stored in the register 271 is selected in every byte from the MSB side as shown in FIG. 16G, and the byte stuff 00h is selected just after the second byte with the value FFh.

Consequently, the data as shown in FIG. 16I is output from the data output unit 243.

In this way, the bit stream generator 133b according to the second embodiment can suitably pack the variable length coded data and the added bit data obtained by the variable length coding, suitably add the marker, and suitably add the byte stuff 00h to the data of the value FFh. As a result, the JPEG processor 109 can suitably generate the JPEG data stream, so it is possible to provide a camera system 100 giving a photographed image as a signal compressed and coded by the JPEG system.

In the bit stream generator 133b according to the second embodiment, the byte stuff 00h is not added by the output data generator 141, but is added by the data output unit 143 arranged just before the output. Accordingly, the bus width in the output data generator 141 and the FIFO buffer 142 may become smaller and the storage capacity of each memory device such as the FIFO buffer 142 also may be made smaller.

Consequently, the size of the circuit may be tremendously reduced. This is extremely effective especially when forming such a circuit on an LSI.

Modification

Note that, the present invention is not limited to the above embodiments and includes modifications within the scope of the claims.

For example, the camera system shown in FIG. 1 and the configurations of the JPEG processor and the variable length coder shown in FIGS. 2 and 3 are not limited to these configurations and may be made any configuration.

Further, the configurations of the bit stream generators shown in FIGS. 4 and 10, the configurations of the output data generators shown in FIGS. 5 and 11, the configuration of the byte stuff inserter shown in FIG. 8, and the configuration of the data output unit shown in FIG. 14 and so on may also be freely modified.

Further, the present invention is able to be applied to any encoded data other than JPEG encoding and any variable length data which is not a result of encoding.

The present invention is not limited to JPEG encoding and image encoding, not limited to a camera system, and can be applied to any signal processing apparatus including variable length coding.

Summarizing the effects of the invention, in this way, according to the present invention, a data stream generation apparatus and a method of the same for generating a string of fixed length data with a predetermined bit length from variable length data with a smaller sized circuit and simpler configuration and control by efficiently carrying out processing such as the insertion of the byte stuff can be provided.

Further, a variable length coded data stream generation apparatus and a method of the same for coding desired data by variable length coding to generate a predetermined data stream efficiently with a smaller sized circuit and simpler configuration and control by efficiently carrying out processing such as insertion of a byte stuff can be provided.

Still further, a camera system for photographing a desired image and coding photographed image data by variable length coding to efficiently generate an image data stream especially by a smaller sized circuit and simpler configuration and control can be provided.

While the invention has been described with reference to specific embodiment chosen for purpose of illustration, it should be apparent that numerous modifications could be made thereto by those skilled in the art without departing from the basic concept and scope of the invention.

What is claimed is:

1. A data stream generation apparatus for generating a data stream including variable length data and predetermined control data, comprising
   a control data inserting means for inserting control data including first data having a predetermined first data pattern at a desired position in a string of variable length data,
   a first data combining means for successively combining the variable length data and the inserted control data,
   a fixed length data extracting means for successively extracting predetermined fixed length data from the combined data,
   a data pattern detecting means for detecting first data having the first data pattern other than the first data included in the control data from the extracted fixed length data, and
   output data selecting means for successively selecting output data from the fixed length data and, when first data other than the first data included in the control data is detected, selecting second data having a predetermined second data pattern immediately after the detected first data as the output data.

2. A data stream generation apparatus as set forth in claim 1,
   further comprising a position information generation means for generating position information of said inserted control data in the string of said variable length data, and
   wherein said data pattern detecting means detects said first data other than said first data included in said control data based on said detected position information of the control data.

3. A data stream generation apparatus as set forth in claim 2,
   further comprising a storage means for storing said extracted fixed length data, and wherein
      said data pattern detection means detects said first data from said stored fixed length data, and
      said output data selecting means successively selects said output data from said stored fixed length data.

4. A data stream generation apparatus as set forth in claim 2, wherein said position information includes data indicating a kind of said inserted control data and data indicating the position of said control data.

5. A data stream generation apparatus as set forth in claim 2, wherein
   said data pattern detecting means comprises;
      a detection means for detecting said first data from said extracted fixed length data,
      an investigation means for investigating whether said detected first data is the first data included in said control data or not, and
      an output means for outputting a signal indicating that said detected first data is the first data not included in said control data when said detected first data is not included in said control data, and
   said output data selecting means selects the output data in response to said signal.

6. A data stream generation apparatus as set forth in claim 2,
   wherein said variable length data comprises a plurality of string of variable length data,
   further comprising a second data combining means for combining a plurality of variable length data corresponding to said plurality of strings to generate one variable length data, and
   wherein said first data combining means combines said combined data in said second data combining means with the remaining data already combined and not extracted as fixed length data.

7. A data stream generation apparatus as set forth in claim 2, wherein said control data inserting means comprises;
   a first data inserting means for inserting predetermined adjustment data just before inserting the control data so that the inserted control data is suitably arranged at the boundary of the bytes when said variable length data and said control data are successively combined in said first combining means, and
   a second data inserting means for inserting said control data into the variable length data in which said adjustment data is already inserted.

8. A data stream generation method for generating a data stream including variable length data and predetermined control data, comprising the steps of:
   inserting control data including first data having a predetermined first data pattern at a desired position in a string of variable length data;
   successively combining the variable length data and the inserted control data;
   successively extracting predetermined fixed length data from the combined data;
   detecting first data having the first data pattern other than the first data included in the control data from the extracted fixed length data;
   successively selecting output data from the fixed length data and, when first data other than the first data included in the control data is detected;
   selecting second data having a predetermined second data pattern immediately after the detected first data as the output data; and
   successively outputting the output data with a fixed length.

9. A data stream generation method as set forth in claim 8,
   further comprising a step of generating position information of said inserted control data in the string of said variable length data, and
   wherein said first data other than said first data included in said control data is detected based on said detected position information of the control data.

10. A data stream generation method as set forth in claim 9, further comprising
    a step of temporarily storing said extracted fixed length data, and wherein
       said first data is detected from said stored fixed length data, and
       said output data is selected successively from said stored fixed length data.

11. A data stream generation method as set forth in claim 9, wherein said position information includes data indicating a type of said inserted control data and data indicating the position of said control data.

12. A data stream generation method as set forth in claim 9, wherein
    said step of the detection of said first data other than the first data further includes the steps of;
       detecting said first data from said extracted fixed length data, investigating whether said detected first data is the first data included in said control data or not, and when said detected first data is not included in said control data, outputting a signal indicating that said detected first data is the first data not included in said control data, and said output data is selected in response to said signal.

13. A data stream generation method as set forth in claim 9, wherein said variable length data comprises a plurality of string of variable length data, further comprising the steps of combining a plurality of variable length data corresponding to said plurality of strings to generate one variable length data, and combining said combined data with the remaining data already combined and not extracted as fixed length data.

14. A data stream generation method as set forth in claim 9, wherein said control data is inserted by inserting predetermined adjustment data just before the inserting control data so that the inserted control data is suitably arranged at the boundary of the bytes when said variable length data and said control data are successively combined, and inserting said control data into the variable length data in which said adjustment data is already inserted.

15. A variable length coded data stream generation apparatus for generating a data stream including variable length coded data and predetermined control data, comprising:

a variable length coding means for coding desired data by variable length coding;

a control data inserting means for inserting control data including first data having a predetermined first data pattern at a desired position of a string of variable length coded data;

a first data combining means for successively combining said variable length coded data and said inserted control data;

a fixed length data extracting means for successively extracting predetermined fixed length data from said combined data;

a data pattern detecting means for detecting the first data having said first data pattern other than the first data included in said control data from said extracted fixed length data; and an output data selecting means for successively selecting an output data from said fixed length data, and, when the first data other than the first data included in said control data is detected, selecting second data having a predetermined second data pattern immediately after the detected first data as the output data.

16. A variable length coded data stream generation apparatus as set forth in claim 15, further comprising a position information generation means for generating position information of said inserted control data in the string of said variable length coded data, and wherein said data pattern detecting means detects said first data other than said first data included in said control data based on said detected position information of the control data.

17. A variable length coded data stream generation apparatus as set forth in claim 16, further comprising a second data combining means for combining the variable length coded data of the result of the variable length coding and auxiliary data generated by the variable length coding, and wherein said first data combining means combines said data combined in said second data combining means with the remaining data already combined and not extracted as fixed length data.

18. A variable length coded data stream generation apparatus as set forth in claim 17, wherein said variable length coding means encodes an input image data by the JPEG system to generate the variable length coded data, the added bit data, and the marker, said second combining means combines said generated variable length coded data and said added bit data, and said control data inserting means inserts a marker into a predetermined position of the combined data string.

19. A variable length coded data stream generation method for generating a data stream including variable length coded data and predetermined control data, comprising the steps of:

coding desired data by variable length coding;

inserting control data including first data having a predetermined first data pattern at the desired position of a string of variable length coded data;

successively combining said variable length coded data and said inserted control data;

successively extracting predetermined fixed length data from said combined data;

detecting the first data having said first data pattern other than the first data included in said control data from said extracted fixed length data;

successively selecting an output data from said fixed length data, and, when the first data other than the first data included in said control data is detected, selecting a second data having a predetermined second data pattern immediately after the detected first data as the output data; and successively outputting said selected output data.

20. A camera system, comprising:

a photographing means for photographing a desired image to generate an image data;

a variable length coding means for coding said generated image data by the variable length coding;

a control data inserting means for inserting control data including first data having a predetermined first data pattern at a desired position of a string of variable length coded image data;

a first data combining means for successively combining said variable length coded image data and said inserted control data;

a fixed length data extracting means for successively extracting predetermined fixed length coded image data from said combined data;

a data pattern detecting means for detecting the first data having said first data pattern other than the first data included in said control data from said extracted fixed length coded image data;

an output image data selecting means for successively selecting an output image data from said fixed length coded image data and, when the first data other than the first data included in said control data is detected, selecting second data having a predetermined second data pattern immediately after the detected first data as the output image data; and a processing means for carrying out predetermined processing on a string of said selected output image data.

21. A camera system as set forth in claim 20, wherein said processing means carries out at least one processing among the storage, the reproduction, and display and the transmittal to the string of said selected output image data.

* * * * *